(12) United States Patent
Yajima et al.

(10) Patent No.: US 12,107,518 B2
(45) Date of Patent: Oct. 1, 2024

(54) ENVIRONMENTAL ENERGY HARVESTING DEVICE

(71) Applicants: The University of Tokyo, Tokyo (JP); Saginomiya Seisakusho, Inc., Tokyo (JP)

(72) Inventors: Takeaki Yajima, Tokyo (JP); Hiroshi Toshiyoshi, Tokyo (JP); Hiroaki Honma, Tokyo (JP); Yukiya Tohyama, Tokyo (JP); Hiroyuki Mitsuya, Sayama (JP)

(73) Assignees: The University of Tokyo, Tokyo (JP); Saginomiya Seisakusho, Inc., Tokyo (JP)

( * ) Notice: Subject to any disclaimer, the term of this patent is extended or adjusted under 35 U.S.C. 154(b) by 331 days.

(21) Appl. No.: 17/621,398

(22) PCT Filed: Jun. 19, 2020

(86) PCT No.: PCT/JP2020/024252
§ 371 (c)(1),
(2) Date: Dec. 21, 2021

(87) PCT Pub. No.: WO2020/262263
PCT Pub. Date: Dec. 30, 2020

(65) Prior Publication Data
US 2022/0360199 A1 Nov. 10, 2022

(30) Foreign Application Priority Data
Jun. 24, 2019 (JP) .................................. 2019-116310

(51) Int. Cl.
*H02N 11/00* (2006.01)
*G05F 1/56* (2006.01)

(52) U.S. Cl.
CPC ........... *H02N 11/002* (2013.01); *G05F 1/561* (2013.01)

(58) Field of Classification Search
CPC ............................. H02N 11/002; G05F 1/561
(Continued)

(56) References Cited

U.S. PATENT DOCUMENTS 10,128,283 B2 * 11/2018 Bryla .................... H01L 27/142
2008/0203823 A1 8/2008 Deppe et al.
(Continued)

FOREIGN PATENT DOCUMENTS

EP 2 278 342 A1 1/2011
JP 2014-049557 A 3/2014
(Continued)

OTHER PUBLICATIONS

International Preliminary Report on Patentability dated Dec. 28, 2021, issued in PCT Application No. PCT/JP2020/024252, filed Jun. 19, 2020.
(Continued)

*Primary Examiner* — Yemane Mehari
(74) *Attorney, Agent, or Firm* — Workman Nydegger

(57) ABSTRACT

An energy harvesting device having an energy converting element that converts environmental energy into electric energy, an environmental sensor that is disposed in an identical environment as the energy converting element, and a power supply circuit that receives electricity from the energy converting element and outputs the electricity to an external load. The power supply circuit is configured to change an operation condition of, for example, a voltage converting circuit of the power supply circuit, in accordance with an output of the environmental sensor.

10 Claims, 7 Drawing Sheets

(58) Field of Classification Search
USPC .......................................................... 323/312
See application file for complete search history.

(56) References Cited

U.S. PATENT DOCUMENTS

| | | | |
|---|---|---|---|
| 2011/0016973 | A1 | 1/2011 | Hamatani et al. |
| 2013/0278297 | A1* | 10/2013 | Mottola ............... H03K 17/063 327/109 |
| 2014/0065751 | A1 | 3/2014 | Suzuki et al. |
| 2014/0098582 | A1* | 4/2014 | Oki ....................... H02M 7/219 363/80 |
| 2017/0063363 | A1 | 3/2017 | Danjo |
| 2019/0252998 | A1 | 8/2019 | Sakamoto et al. |

FOREIGN PATENT DOCUMENTS

| | | | | |
|---|---|---|---|---|
| JP | 2014-075950 | A | 4/2014 | |
| JP | 2017-046046 | A | 3/2017 | |
| JP | 2018-074817 | A | 5/2018 | |
| WO | 2011/079879 | A1 | 7/2011 | |
| WO | WO-2017191436 | A1 * | 11/2017 | ............. H02K 11/04 |

OTHER PUBLICATIONS

Shoucheng Li et al., *A Novel Voltage Limiter Circuit for Passive RFID Tag*, IET Conference Proceedings, Jan. 1, 2012, pp. 1-4, XP093042184.

Communication Pursuant to Article 94(3) EPC, dated Sep. 18, 2023, issued in EP Application No. 20 833 259.3.

* cited by examiner

ENVIRONMENTAL ENERGY HARVESTING DEVICE

TECHNICAL FIELD

The present invention relates to an environmental energy harvesting device.

BACKGROUND ART

Known environmental energy harvesting devices that harvest low-power energy present in an environment and convert it into electric energy, or perform what is called energy harvesting include systems for photovoltaic electricity generation, for thermoelectric electricity generation, and for energy harvesting from environmental vibration with a vibration-driven energy harvesting element that is a microelectromechanical system (MEMS) vibrational element. (See Patent Literature 1).

CITATION LIST

Patent Literature

Patent Literature 1: Japanese Patent Laid-Open No. 2018-74817

SUMMARY OF INVENTION

Technical Problem

Because energy present in an environment has low power, there is a demand for a vibration-driven energy harvesting device that converts environmental energy into electric energy with low loss.

Solution to Problem

An environmental energy harvesting device according to a first aspect includes: an energy converting element that converts environmental energy into electric energy; an environmental sensor that is disposed in an identical environment as the energy converting element; and a power supply circuit that receives electricity converted into by the energy converting element and outputs the electricity to an outside, wherein the power supply circuit changes an operation condition in accordance with an output of the environmental sensor.

In an environmental energy harvesting device according to a second aspect, it is preferable that the power supply circuit changes the operation condition in accordance with a real-time output from the environmental sensor in the environmental energy harvesting device according to the first aspect.

In an environmental energy harvesting device according to a third aspect, it is preferable that the energy converting element is an element that generates alternating-current electricity, the power supply circuit includes a rectifier circuit that rectifies alternating-current electricity converted into by the energy converting element, and the rectifier circuit includes a switching element that changes a connection condition for the circuit in accordance with the output of the environmental sensor in the environmental energy harvesting device according to the first or second aspect.

In an environmental energy harvesting device according to a fourth aspect, it is preferable that the environmental sensor outputs an alternating-current signal with a frequency equal to a frequency of the alternating-current electricity converted into by the energy converting element in the environmental energy harvesting device according to the third aspect.

In an environmental energy harvesting device according to a fifth aspect, it is preferable that the power supply circuit includes a voltage limiting circuit that limits the alternating-current signal output by the environmental sensor to a voltage within a predetermined range in the environmental energy harvesting device according to the fourth aspect.

In an environmental energy harvesting device according to a sixth aspect, it is preferable that the voltage limiting circuit includes a diode bridge circuit that is formed with MOSFETs in the environmental energy harvesting device according to the fifth aspect.

In an environmental energy harvesting device according to a seventh aspect, it is preferable that the voltage limiting circuit includes: a dynamic comparator that receives the alternating-current signal output by the environmental sensor; and a memory circuit that stores an output of the dynamic comparator in the environmental energy harvesting device according to the fifth aspect.

In an environmental energy harvesting device according to an eighth aspect, it is preferable that the voltage limiting circuit includes two rectifying elements that are arranged in parallel on an input side of the dynamic comparator such that orientations of anodes and cathodes of the rectifying elements are inverse to each other in the environmental energy harvesting device according to the seventh aspect.

In an environmental energy harvesting device according to a ninth aspect, it is preferable that the power supply circuit includes a current-voltage conversion circuit that outputs a voltage signal in accordance with an amount of current output by the environmental sensor, and the power supply circuit changes the operation condition based on an output voltage from the current-voltage conversion circuit in the environmental energy harvesting device according to the first or second aspect.

In an environmental energy harvesting device according to a tenth aspect, it is preferable that the current-voltage conversion circuit includes a circuit in which a plurality of voltage detection circuits are connected in series, the voltage detection circuits including rectifying element pairs in each of which rectifying elements are arranged in parallel such that orientations of anodes and cathodes of the rectifying elements are inverse to each other and including detection circuits that detect voltages that occur at one ends of the rectifying element pairs, and the power supply circuit changes the operation condition based on detection signals from the plurality of voltage detection circuits in the environmental energy harvesting device according to the ninth aspect.

In an environmental energy harvesting device according to an eleventh aspect, it is preferable that the energy converting element and the environmental sensor are vibration-driven energy harvesting elements in the environmental energy harvesting device according to any one of the first to tenth aspects.

Advantageous Effect of Invention

According to the present invention, it is possible to convert low-power energy present in an environment into electric energy with high efficiency.

DESCRIPTION OF EMBODIMENTS (Environmental Energy Harvesting Device in First Embodiment)

An environmental energy harvesting device 1 in a first embodiment will be described below with reference to FIG. 1 and FIG. 2.

Figure 1:
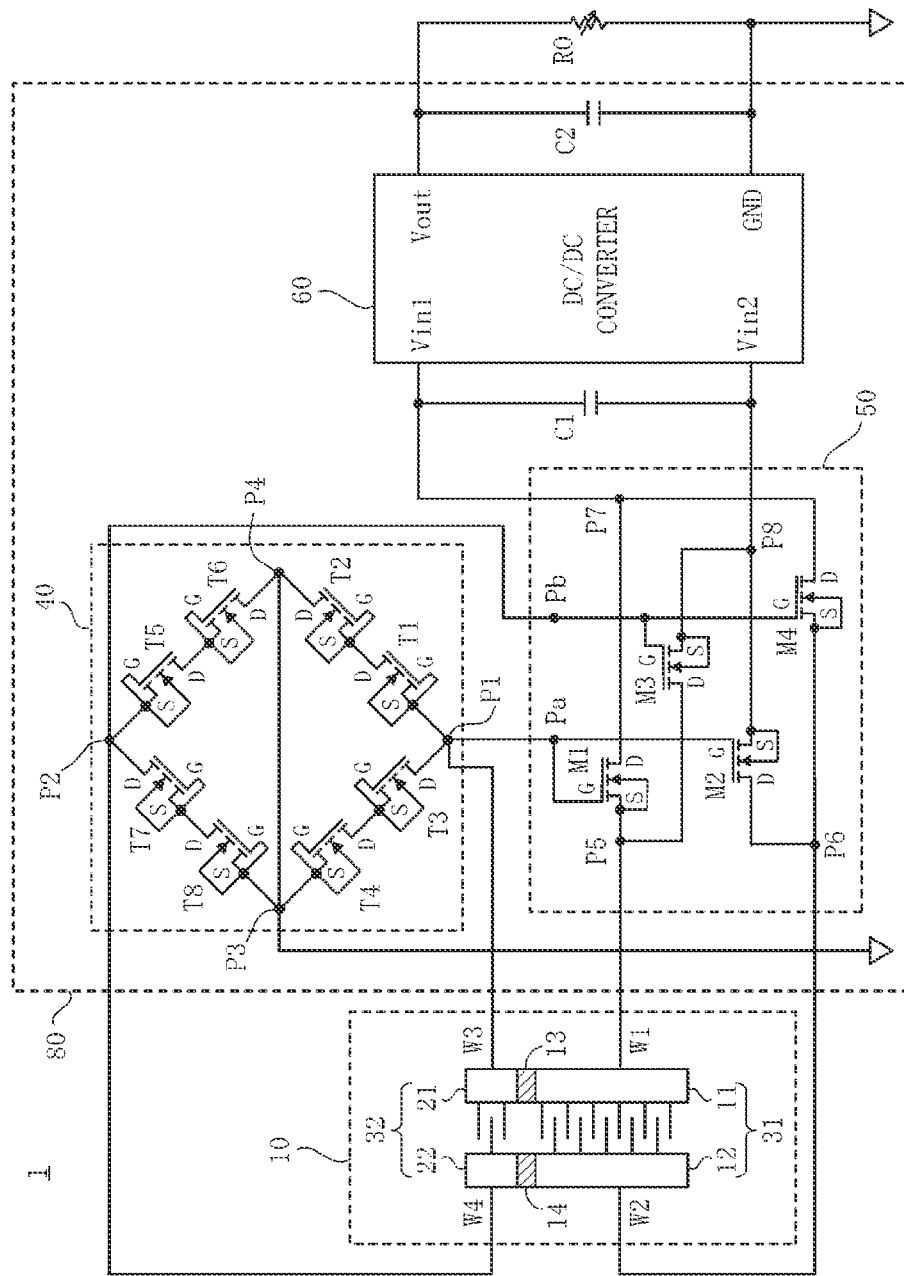
FIG. 1 is a diagram illustrating a schematic configuration of an environmental energy harvesting device 1 in a first embodiment.

FIG. 1 is a diagram illustrating a schematic configuration of the environmental energy harvesting device 1 in the first embodiment. The environmental energy harvesting device 1 includes a vibration-driven energy harvesting section 10 that generates alternating-current electricity from environmental vibration and a power supply circuit 80 that takes out and outputs the generated alternating-current electricity to an external device or the like.

The power supply circuit 80 includes a voltage limiting circuit 40, a rectifier circuit 50, a voltage converting circuit 60, a first capacitor C1, and a second capacitor C2, which will be described later.

As an example, the vibration-driven energy harvesting section 10 is a capacitive type energy harvesting element that includes electret electrodes (electret type energy harvesting element), the schema of which will be described with reference to FIG. 2.

The vibration-driven energy harvesting section 10 includes a first electrode 11, which is a fixed electrode, and a second electrode 12, which is a movable electrode. The first electrode 11 and the second electrode 12 form a vibration-driven energy harvesting element, which is an example of an energy converting element that converts environmental energy into electric energy. The first electrode 11 and the second electrode 12 will be herein also referred to as an energy converting element 31 as a generic term.

As an example, the first electrode 11 is a comb electrode that includes six tooth portions 15, and as an example, the second electrode 12 is a comb electrode that includes five tooth portions 16. Note that the numbers of the comb electrodes forming both electrodes are not limited to the numbers described above.

The vibration-driven energy harvesting section 10 further includes a third electrode 21, which is a fixed electrode, and a fourth electrode 22, which is a movable electrode, and the third electrode 21 and the fourth electrode 22 are arranged in a pair at a position shifted from a pair including the first electrode 11 and the second electrode 12 in a Y direction. The third electrode 21 and the fourth electrode 22 form a vibration-driven energy harvesting element, which is an example of an environmental sensor. The third electrode 21 and the fourth electrode 22 will be herein also referred to as an environmental sensor 32 as a generic term.

As an example, the third electrode 21 includes two tooth portions 23, and as an example, the fourth electrode 22 is a comb electrode that includes one tooth portion 24. The numbers of the comb electrodes forming the third electrode 21 and the fourth electrode 22 are not limited to the numbers described above but are smaller than the numbers of the comb electrodes forming the first electrode 11 and the second electrode 12 described above, respectively.

The first electrode 11 is connected to an output line W1, the second electrode 12 is connected to an output line W2, the third electrode 21 is connected to an output line W3, and the fourth electrode 22 is connected to an output line W4. The output lines W1 to W4 are formed of, for example, a metal having a low electric resistance and being rich in ductility, such as gold.

The phrase "being connected" used herein means that two objects are in an electrically conductive state directly or via a material having a low resistance such as metal.

The tooth portions 15, 16, 23, and 24 of the first to fourth electrodes 11, 12, 21, and 22 described above have a predetermined thickness in a Z direction in the drawing and face each other in areas where they mesh with each other. The first to fourth electrodes 11, 12, 21, and 22 can be produced in a form of MEMS structures made of, for example, silicon as a base material.

In a surface region 17 of faces of the tooth portion 15 of the first electrode 11 that face the tooth portion 16 of the second electrode 12, an electret having a positive or negative electric charge is formed by being subjected to a known charging process (e.g., the charging process described in Japanese Patent Laid-Open No. 2014-049557). Also, in a surface region 25 of faces of the tooth portion 23 of the third electrode 21 that face the tooth portion 24 of the fourth electrode 22, an electret having a positive or negative electric charge is formed similarly.

By being electretized, the tooth portions 15 of the first electrode 11 and the tooth portions 23 of the third electrode 21 are electrically charged semipermanently. As a result, in the tooth portions 16 of the second electrode 12, which face the electretized electrode, induced electric charge of a property opposite to that of the electretized electrode, that is, a negative or positive inductive electric charge is induced. Similarly, in the tooth portion 24 of the fourth electrode 22, which faces the electretized electrode, a negative or positive inductive electric charge is induced.

The first electrode 11 and the third electrode 21 are retained by an insulation support frame 13 integrally and fixedly.

On the other hand, the second electrode 12 and the third electrode 22 are retained by a retaining part 14 (electrode retaining portion 14a, connecting portions 14b, and fixed portions 14c) integrally and are retained such that they vibrate with respect to the support frame 13 in an up-down direction in the drawing (X direction). The retaining part 14 includes the electrode retaining portion 14a, which retains the second electrode 12 and the fourth electrode 22, the fixed portions 14c, which are fixed to the support frame 13, and the connecting portions 14b, which connect the electrode retaining portion 14a and the fixed portions 14c and have flexibility.

The connecting portions 14b are thin pieces that are thin in the X direction and thick in the Z direction in FIG. 1 and is made of a flexible material such as metal. When vibration is applied to the support frame 13 from the outside, the two connecting portions 14b provided on the right and left in the drawing of the electrode retaining portion 14a are bent, and thus the electrode retaining portion 14a vibrates with respect to the support frame 13 in the X direction. As a result, the second electrode 12 retained by the electrode retaining portion 14a is configured to vibrate with respect to the first electrode 11 fixed to the support frame 13 in the X direction. Similarly, the fourth electrode 22 retained by the electrode retaining portion 14a is configured to vibrate with respect to the third electrode 21 fixed to the support frame 13 in the X direction.

When the vibration-driven energy harvesting section 10 vibrates in the X direction, relative movement between the first electrode 11 and the second electrode 12 in the X direction involves fluctuations of an area of faces on which the tooth portions 15 of the first electrode 11 and the tooth portions 16 of the second electrode 12 face one another. As a result, the fluctuations of the area cause variations of the inductive electric charge of the electrets, so that a potential difference between the first electrode 11 and the second electrode 12 changes, generating electromotive force. This causes the energy converting element 31 (the first electrode 11 and the second electrode 12), which is a vibration-driven energy harvesting element, to convert vibration energy into electric energy (generate electricity).

When the vibration-driven energy harvesting section 10 vibrates in the X direction, the third electrode 21 and the fourth electrode 22, which are the environmental sensor 32, perform a relative movement in the X direction, and thus a current is also generated between the third electrode 21 and the fourth electrode 22 and has the same sign as a current that is generated between the first electrode 11 and the second electrode 12.

Since the environmental sensor 32 is disposed in the same environment as the energy converting element 31 described above (the first electrode 11 and the second electrode 12), the environmental sensor 32 produces and outputs a current that exactly reflects a state of electricity generated by the energy converting element 31, namely, an electric signal.

Note that the number of the tooth portions 23 and 24 included in the environmental sensor 32 is smaller than the number of the tooth portions 15 and 16 included in the energy converting element 31. Therefore, electricity converted into by the environmental sensor 32 becomes electricity lower than electricity converted into by the energy converting element 31 generally in proportion to a ratio between the numbers of the tooth portions.

The description will be continued below with reference to FIG. 1.

In the vibration-driven energy harvesting section 10, another end of the output line W1 connected to the first electrode 11 forming the energy converting element 31 is connected to a first input part P5 of the rectifier circuit 50 included in the power supply circuit 80. At the same time, another end of the output line W2 connected to the second electrode 12 is connected to a second input part P6 of the rectifier circuit 50.

The energy converting element 31, which is a vibration-driven energy harvesting element, generates alternating-current electricity, and it is thus desirable to convert alternating current into direct current for effective use of the electricity.

As an example, the rectifier circuit 50 includes four switching elements M1 to M4 each including an nMOSFET. In each of the switching elements M1 to M4, an electrode with a sign S indicates source, an electrode with a sign G indicates gate, and an electrode with a sign D indicates drain.

When a positive voltage is input into a first control input part Pa of the rectifier circuit 50, the positive voltage is applied to the gate G of the switching element M1 and the first input part P5 conducts with a first output part P7, and the positive voltage is applied to the gate G of the switching element M2 and the second input part P6 conducts with a second output part P8.

In contrast, when a negative voltage is input into the first control input part Pa, the negative voltage is applied to the gate G of the switching element M1 and the first input part P5 is interrupted from the first output part P7, and the negative voltage is applied to the gate G of the switching element M2 and the second input part P6 is interrupted from the second output part P8.

When a positive voltage is input into a second control input part Pb of the rectifier circuit 50, the positive voltage is applied to the gate G of the switching element M3 and the first input part P5 conducts with the second output part P8, and the positive voltage is applied to the gate G of the switching element M4 and the second input part P6 conducts with the first output part P7.

In contrast, when a negative voltage is input into the second control input part Pb, the negative voltage is applied to the gate G of the switching element M3 and the first input part P5 is interrupted from the second output part P8, and the negative voltage is applied to the gate G of the switching element M4 and the first input part P5 is interrupted from the first output part P7.

Therefore, in a case where the first input part P5 is at a positive voltage, and the second input part P6 is at a negative voltage, a voltage of the first output part P7 can be made to be higher than a voltage of the second output part P8 by applying a positive voltage to the first control input part Pa and a negative voltage to the second control input part Pb. In contrast, in a case where the first input part P5 is at a negative voltage, and the second input part P6 is at a positive voltage, the voltage of the first output part P7 can be similarly made to be higher than the voltage of the second output part P8 by applying a negative voltage to the first control input part Pa and a positive voltage to the second control input part Pb. That is, by applying a negative voltage to the first control input part Pa and the voltage described above to the second control input part Pb, it is possible to cause the first output part P7 and the second output part P8 to output rectified electricity.

For a conventional environmental energy harvesting device, a bridge circuit formed with four diodes or a synchronous rectifier circuit including the same MOSFETs as those of the rectifier circuit 50 is used as a rectifying circuit.

However, in a rectifier circuit formed with diodes, part of electricity converted into by an energy converting element is consumed by the diodes.

In contrast, in a conventional synchronous rectifier circuit including MOSFETs, a control voltage signal for synchronous control of the MOSFETs is generated from alternating-current electricity generated by an energy converting element. Therefore, in conventional practice, part of alternating-current electricity generated by an energy converting element is consumed for generating a control voltage signal.

It is thus impossible for a conventional environmental energy harvesting device to convert vibration energy harvested by a vibration-driven energy harvesting section into electric energy and output the electric energy efficiently.

In contrast, in the rectifier circuit 50 included in the environmental energy harvesting device 1 in the first embodiment, an electric signal that is generated by and output from the environmental sensor 32 separate from the energy converting element 31 and a voltage value of which is limited by the voltage limiting circuit 40 is used as a control signal for controlling the switching elements M1 to M4.

This enables the environmental energy harvesting device 1 in the first embodiment to convert vibrational energy harvested by the vibration-driven energy harvesting section 10 into electric energy efficiently.

A reason that the environmental sensor 32 and the voltage limiting circuit 40 can generate the control signal for the switching elements M1 to M4 while reducing loss of vibrational energy harvested by the vibration-driven energy harvesting section 10 in the environmental energy harvesting device 1 in the first embodiment will be described.

In the vibration-driven energy harvesting section 10, another end of the output line W3 connected to the third electrode 21 forming the environmental sensor 32 is connected to a first input part P1 of the voltage limiting circuit 40 included in the power supply circuit 80. The first input part P1 of the voltage limiting circuit 40 is connected to the first control input part Pa of the rectifier circuit 50.

At the same time, another end of the output line W4 connected to the fourth electrode 22 forming the environmental sensor 32 is connected to a second input part P2 of the voltage limiting circuit 40. The second input part P2 of the voltage limiting circuit 40 is connected to the second control input part Pb of the rectifier circuit 50.

As illustrated in FIG. 1, the voltage limiting circuit 40 includes a bridge circuit formed with a plurality of control elements T1 to T8 each including a MOSFET. As an example, the eight control elements T1 to T8 are each a normally-off nMOSFET, in which an electrode with a sign S indicates source, an electrode with a sign G indicates gate, and an electrode with a sign D indicates drain.

A middle part P3 and a middle part P4 of the bridge circuit formed with the eight control elements T1 to T8 are short circuited and connected to the ground.

The first input part P1 is connected to a source S and a gate G of the control element T1, a drain D of the control element T1 is connected to a source S and a gate G of the control element T2, and a drain D of the control element T2 is connected to the middle part P4.

The middle part P4 is also connected to a drain D of the control element T6, a source S and a gate G of the control element T6 are connected to a drain D of the control element T5, and a source S and a gate G of the control element T5 are connected to the second input part P2.

The first input part P1 is also connected to a drain D of the control element T3, a source S and a gate G of the control element T3 are connected to a drain D of the control element T4, and a source S and a gate G of the control element T4 are connected to the middle part P3.

The middle part P3 is also connected to a source S and a gate G of the control element T8, a drain D of the control element T8 is connected to a source S and a gate G of the control element T7, and a drain D of the control element T7 is connected to the second input part P2.

With the configuration of the voltage limiting circuit 40 described above, when a positive voltage is input into the first input part P1, the control element T1 and the control element T2 become conductive, and an upper limit of a voltage of the first input part P1 is limited to a sum of a threshold voltage of the control element T1 and a threshold voltage of the control element T2. In contrast, when a negative voltage is input into the first input part P1, the control element T3 and the control element T4 become conductive, and a lower limit (a negative upper limit) of the voltage of the first input part P1 is limited to a sum of a threshold voltage of the control element T3 and a threshold voltage of the control element T4.

Even when a positive voltage is input into the second input part P2, the control element T5 and the control element T6 become conductive, and an upper limit of a voltage of the second input part P2 is limited to a sum of a threshold voltage of the control element T5 and a threshold voltage of the control element T6. When a negative voltage is input into the second input part P2, the control element T7 and the control element T8 become conductive, and a lower limit (a negative upper limit) of the voltage of the second input part P2 is limited to a sum of a threshold voltage of the control element T7 and a threshold voltage of the control element T8.

Therefore, an upper limit value and a lower limit value of an output voltage from the environmental sensor 32 are limited by the voltage limiting circuit 40 to predetermined voltages that are determined based on the threshold voltages of the control elements T1 to T8. In a case where an output from the environmental sensor 32 exceeds the predetermined voltages described above, a conductive state occurs between the first input part P1 and the second input part P2 by more than one of the control elements T1 to T8, so that the first input part P1 and the second input part P2 are connected to each other with an extremely small electric resistance.

As a result, vibration energy consumed by the environmental sensor 32 is sufficiently small when compared with vibrational energy to be converted into electric energy by the energy converting element 31. Therefore, even when the vibration energy at the environmental sensor 32 is all consumed, the consumption has no influence on an efficiency of the energy converting element 31.

Accordingly, vibrational energy harvested by the vibration-driven energy harvesting section 10 including the environmental sensor 32 and the energy converting element 31 is charged to C1 efficiently. It is therefore possible to convert very small vibrational energy present in an environment into electric energy efficiently with the energy converting element 31.

Note that the number of the control elements T1 to T8 (MOSFETs) disposed between the first input part P1 and the middle part P3 or the middle part P4 and between the second input part P2 and the middle part P3 or the middle part P4, of voltage limiting circuit 40, is not limited to two described above. Any number of control elements T1 to T8 that corresponds to values of the upper limit value and the lower limit value of the voltage to be controlled by the voltage limiting circuit 40 may be disposed.

By rectifying action by the rectifier circuit 50, the rectifier circuit 50 outputs electricity of which a voltage at the first output part P7 is positive with respect to the second output part P8. The first output part P7 of the rectifier circuit 50 is connected to a first input part Vin1 of the voltage converting circuit 60, and the second output part P8 of the rectifier circuit 50 is connected to a second input part Vin2 of the voltage converting circuit 60. In addition, the first output part P7 and the second output part P8 of the rectifier circuit 50 are connected to both ends of the first capacitor C1.

The voltage converting circuit 60 is a DC/DC converter using a chopper or the like as an example; the voltage converting circuit 60 converts a voltage input between the first input part Vin1 and the second input part Vin2 into a predetermined voltage and outputs the predetermined voltage from an output part Vout. The output part Vout and a ground part GND are connected to both ends of the second capacitor C2.

The gate G of each of the switching elements M1 to M4 in the rectifier circuit 50 is supplied with a real-time output, which is output from the environmental sensor 32 under the same vibration condition as that for the electricity from the energy converting element 31 to be rectified and has the same phase as that of the electricity from the energy converting element 31.

Therefore, the power supply circuit 80 including the rectifier circuit 50 can output the electricity from the energy converting element 31 to the outside efficiently.

Note that the voltage converting circuit 60 is a circuit for converting the electricity output from the rectifier circuit 50 into a voltage suitable for an external load R0. Accordingly, in a case where the voltage suitable for the external load R0 matches the output voltage of the rectifier circuit 50 or a case where the external load R0 has a function of converting the voltage on its own, the power supply circuit 80 need not include the voltage converting circuit 60. In addition, in a case where the external load R0 includes a capacitor equivalent to the second capacitor C2, the power supply circuit 80 need not include the second capacitor C2.

Although the environmental energy harvesting device 1 in the first embodiment described above is assumed to include the voltage limiting circuit 40, the voltage limiting circuit 40 may be omitted. In this case, the other end of the output line W3 connected to the third electrode 21 forming the environmental sensor 32 of the vibration-driven energy harvesting section 10 is connected to the first control input part Pa of the rectifier circuit 50, and the other end of the output line W4 connected to the fourth electrode 24 is connected to the second control input part Pb of the rectifier circuit 50.

By omitting the voltage limiting circuit 40, a resistance value of the circuit connected to the environmental sensor 32 increases. However, also in this case, the vibrational energy consumed by the environmental sensor 32 is sufficiently small for the entire amount of electricity generated, and thus a significant loss of energy will not occur.

The environmental energy harvesting device 1 in the first embodiment described above includes the energy converting element 31 that converts environmental energy into electric energy and the environmental sensor 32 that is disposed in the same environment as the energy converting element 31. The environmental energy harvesting device 1 further includes the power supply circuit 80 that receives the electricity converted into by the energy converting element 31 and outputs the electricity to the outside, and rectifier circuit 50 included in the power supply circuit 80 changes a rectification condition, an example of an operation condition, in accordance with the output of the environmental sensor 32.

(Environmental Energy Harvesting Device in Second Embodiment)

An environmental energy harvesting device 1a in a second embodiment will be described below with reference to FIG. 3 to FIG. 5. The environmental energy harvesting device 1a in the second embodiment has a configuration most of which is the same as the configuration of the environmental energy harvesting device 1 in the first embodiment described above, and thus the same components will be denoted by the same reference characters and description thereof will be omitted as appropriate.

Figure 3:
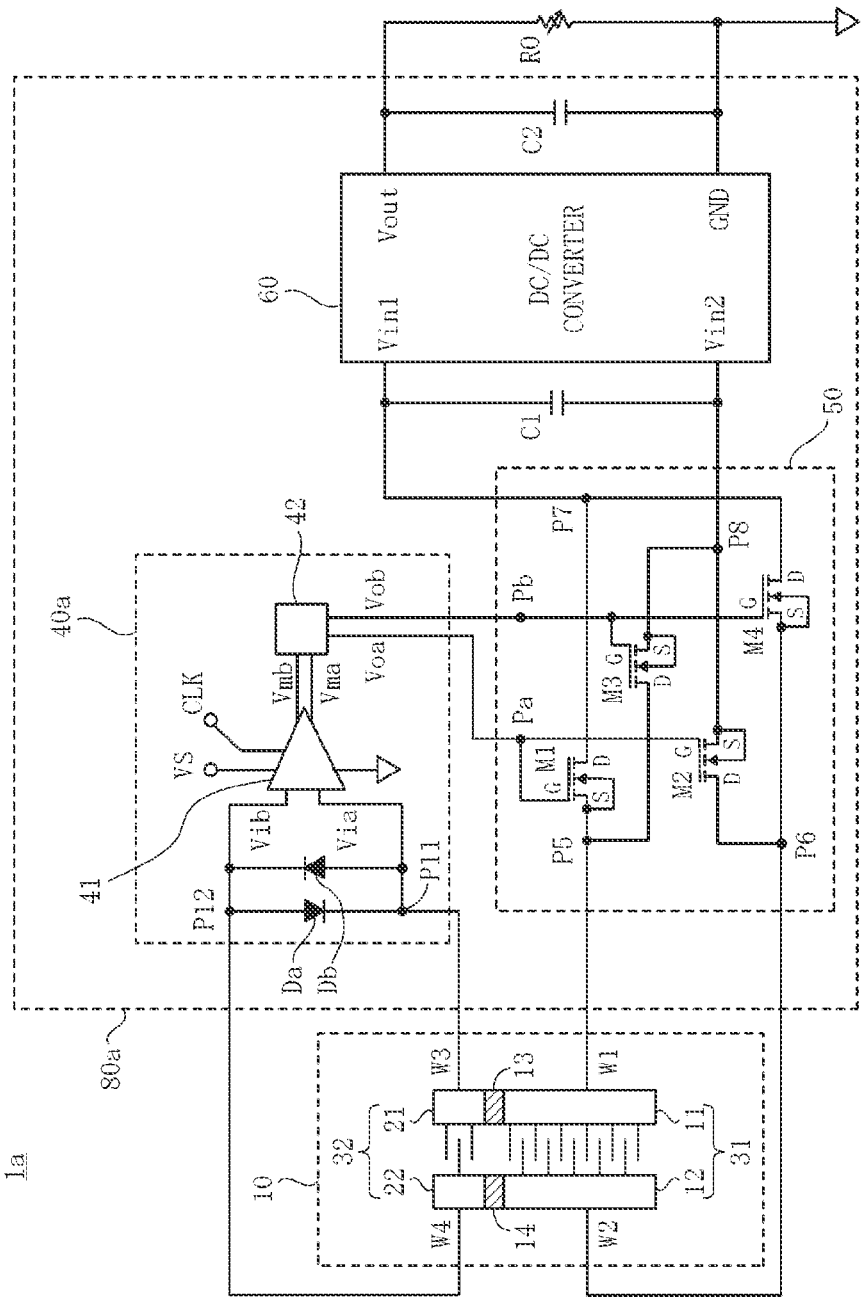
FIG. 3 is a diagram illustrating a schematic configuration of an environmental energy harvesting device 1a in a second embodiment.

FIG. 3 is a diagram illustrating a schematic configuration of the environmental energy harvesting device 1a in the second embodiment. The environmental energy harvesting device 1a in the second embodiment is different from the environmental energy harvesting device 1 in the first embodiment described above in a configuration of a voltage limiting circuit 40a, which forms a power supply circuit 80a.

The voltage limiting circuit 40a is configured to include a dynamic comparator 41 that operates in synchronization with a supplied clock signal CLK and a memory circuit 42 that stores an output of the dynamic comparator 41. In addition, the voltage limiting circuit 40a is configured to include two rectifying elements Da and db that are arranged in parallel on an input side of the dynamic comparator 41 such that orientations of anodes and cathodes of the rectifying elements Da and db are inverse to each other.

In a vibration-driven energy harvesting section 10, another end of an output line W3 connected to a third electrode 21 forming an environmental sensor 32 is connected to a first input part P11 of the voltage limiting circuit 40a. At the same time, another end of an output line W4 connected to a fourth electrode 22 is connected to a second input part P12 of the voltage limiting circuit 40a.

The first input part P11 is connected to the cathode of the rectifying element Da, such as a diode, and the anode of the rectifying element db, such as a diode. The second input part P12 is connected to the anode of the rectifying element Da and the cathode of the rectifying element db.

The first input part P11 is further connected to a first input part Via of the dynamic comparator 41, and the second input part P12 is further connected to a second input part Vib of the dynamic comparator 41.

Two outputs Vma and Vmb from the dynamic comparator 41 are connected to the memory circuit 42. Two outputs Voa and Vob from the memory circuit 42 are connected to a first control input part Pa and a second control input part Pb of a rectifier circuit 50, respectively.

Figure 4:
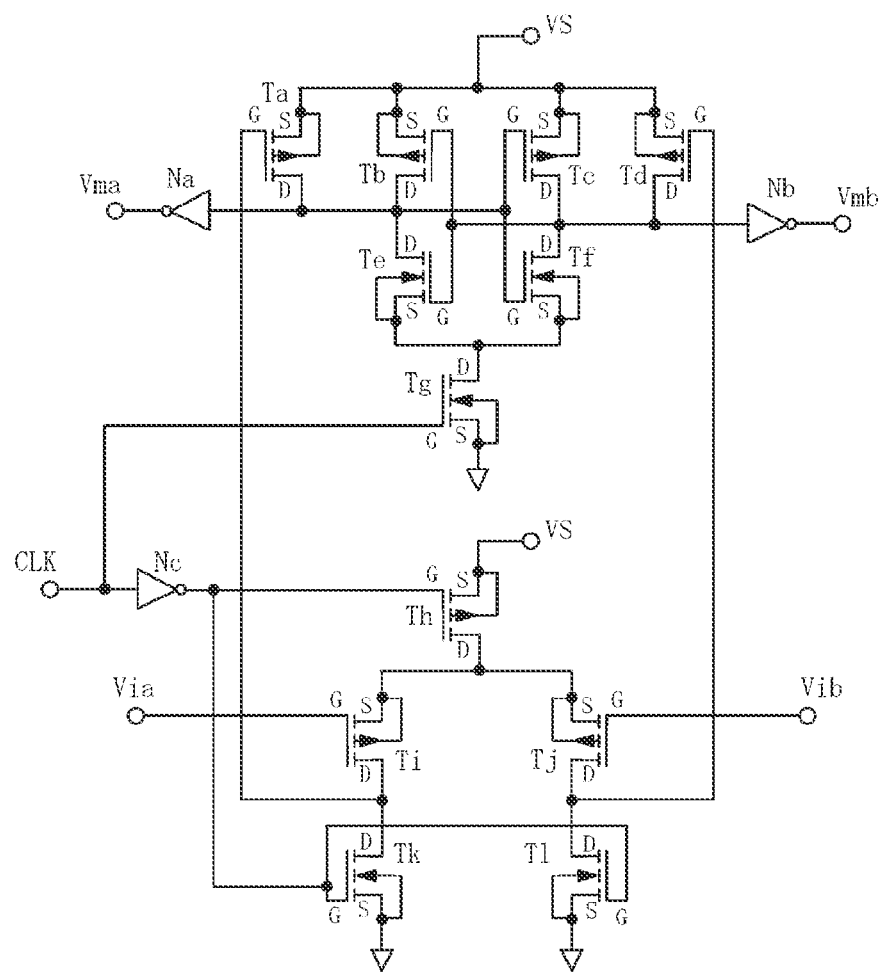
FIG. 4 is a diagram illustrating an example of a circuit diagram of a dynamic comparator.

FIG. 4 is a diagram illustrating an example of a circuit diagram of the dynamic comparator 41. The dynamic comparator 41 is a circuit including elements Te, Tf, Tg, Tk, and Tl being nMOSFETs and elements Ta, Tb, Tc, Td, Th, Tl, and Tj being pMOSFETs. The dynamic comparator 41 is supplied with a power supply voltage VS and the clock signal CLK from the outside. A part of the clock signal CLK is input to gates of the element Th and the element Tk via an inverter (NOT) circuit Nc.

Note that details of a configuration of the dynamic comparator are disclosed in, for example, Japanese Patent Laid-Open No. 2017-46046 or the like, and thus the detailed description thereof will be omitted here.

The dynamic comparator 41 compares magnitude of voltage between a signal input into the first input part Via and a signal input to the second input part Vib and outputs a result of the comparison to the output Vma and the output Vmb only when the clock signal CLK supplied from the outside has a positive voltage. Inverter circuits Na and Nb are connected respectively to stages preceding the output Vma and the output Vmb.

As an example, when the voltage of the first input part Via is on a positive side of the voltage of the second input part Vib, a positive voltage is output to the output Vma, and a ground potential is output to the output Vmb. Conversely, when the voltage of the first input part Via is on a negative side of the voltage of the second input part Vib, the ground potential is output to the output Vma, and the positive voltage is output to the output Vmb.

The output Vma and the output Vmb of the dynamic comparator 41 are output only when the clock signal CLK has the positive voltage. Thus, the outputs are stored in the memory circuit 42.

Figure 5:
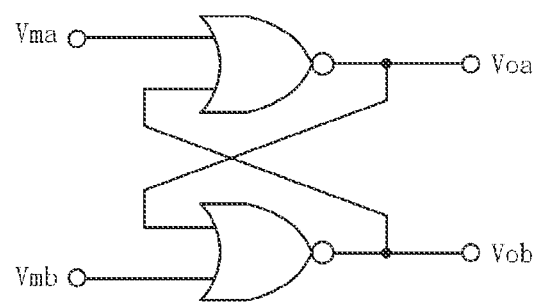
FIG. 5 is a diagram illustrating an example of a logic diagram of a memory circuit.

FIG. 5 is a diagram illustrating an example of a logic diagram of the memory circuit 42. As an example, the memory circuit 42 is what called a NOR flip-flop circuit and stores and retains whether an input Vma and an input Vmb are a positive voltage and a zero voltage or the zero voltage and the positive voltage, respectively.

As described above, the two outputs Voa and Vob from the memory circuit 42 are input into the first control input part Pa and the second control input part Pb of the rectifier circuit 50, respectively.

Therefore, in the environmental energy harvesting device 1a in the second embodiment, the rectifier circuit 50 rectifies alternating-current electricity generated by an energy converting element 31 based on the outputs of the dynamic comparator 41.

The power supply voltage VS necessary for the dynamic comparator 41 to operate can be supplied from, for example, a part of electricity charged in the second capacitor C2. In addition, a clock generation circuit that generates the clock signal CLK can be driven by a part of the electricity charged in the second capacitor C2.

A period of the clock signal CLK is, as an example, a frequency of about five to ten times or more a frequency of alternating-current electricity generated by the energy converting element 31, that is, a frequency at which a second electrode 12 vibrates.

The dynamic comparator 41 operates only when the clock signal CLK supplied from the outside has the positive voltage. Accordingly, using a clock signal CLK having a low duty (On/Off ratio) can minimize electricity necessary for the operation of the dynamic comparator 41. As a result, vibrational energy harvested by the vibration-driven energy harvesting section 10 including the environmental sensor 32 and the energy converting element 31 can be used for the electricity generation by the energy converting element 31 efficiently.

Note that although the rectifying elements Da and db disposed on the input side of the dynamic comparator 41 are for limiting input voltages to the first input part Via and the second input part Vib of the dynamic comparator 41, the rectifying elements Da and db may be omitted in a case where the limiting of the input voltages is unnecessary.

(Environmental Energy Harvesting Device in Third Embodiment)

An environmental energy harvesting device 1b in a third embodiment will be described below with reference to FIG. 6. The environmental energy harvesting device 1a in the third embodiment has a configuration most of which is the same as the configuration of the environmental energy harvesting device 1 in the first embodiment described above or the environmental energy harvesting device 1a in the second embodiment described above, and thus the same components will be denoted by the same reference characters and description thereof will be omitted as appropriate.

Figure 6:
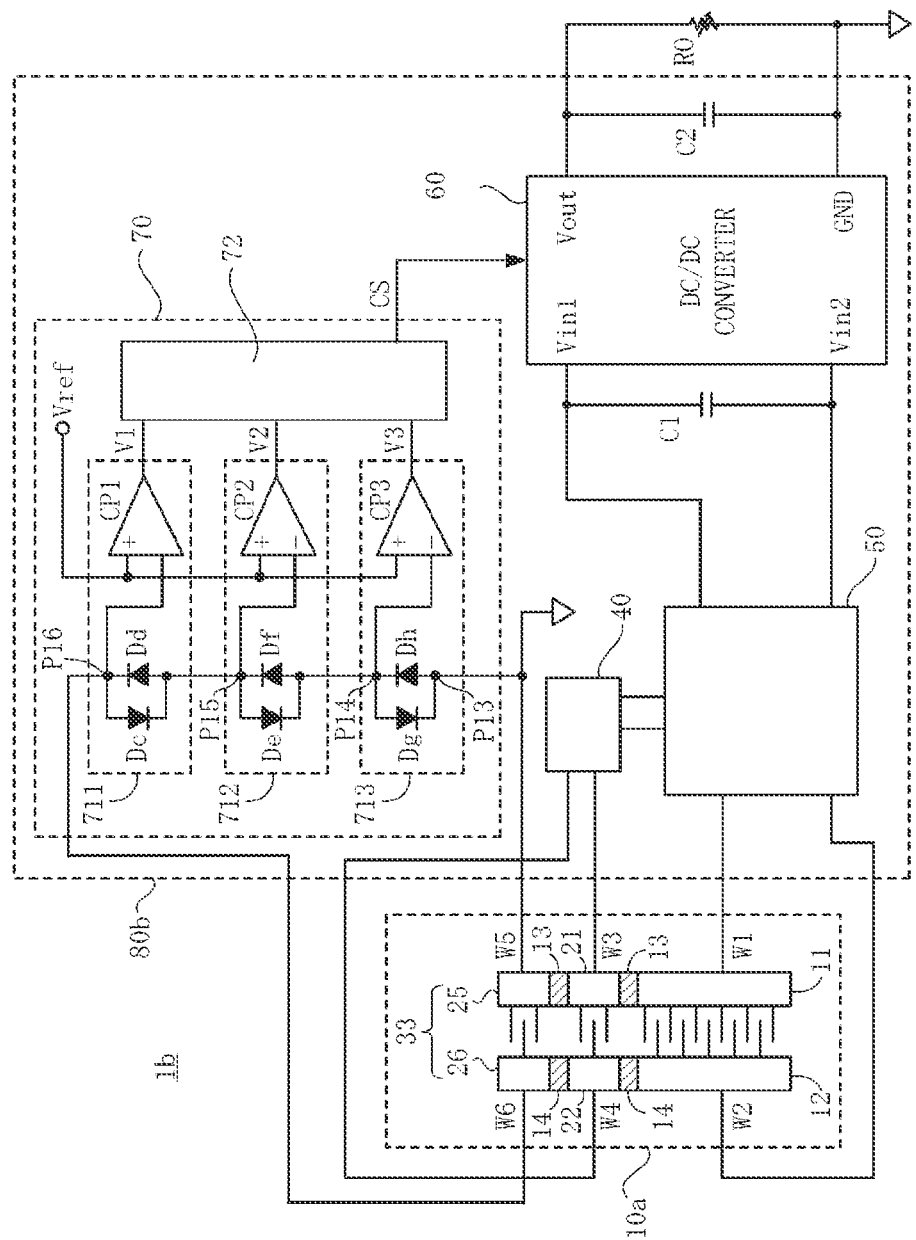
FIG. 6 is a diagram illustrating a schematic configuration of an environmental energy harvesting device 1b in a third embodiment.

FIG. 6 is a diagram illustrating a schematic configuration of the environmental energy harvesting device 1b in the third embodiment. The environmental energy harvesting device 1b in the third embodiment is different from the environmental energy harvesting device 1 in the first embodiment and the environmental energy harvesting device 1a in the second embodiment in that a power supply circuit 80b includes a current-voltage conversion circuit 70.

A rectifier circuit 50 included in the environmental energy harvesting device 1b in the third embodiment is the same as the rectifier circuit 50 included in the environmental energy harvesting device 1 in the first embodiment described above and the environmental energy harvesting device 1a in the second embodiment described above, and thus is not illustrated in detail in FIG. 6.

In addition, a voltage limiting circuit 40 included in the environmental energy harvesting device 1b in the third embodiment is the same as the voltage limiting circuit 40 included in the environmental energy harvesting device 1 in the first embodiment described above or the voltage limiting circuit 40a included in the environmental energy harvesting device 1a in the second embodiment described above, and thus is not illustrated in detail in FIG. 6.

A vibration-driven energy harvesting section 10a is also different in that it further includes a second environmental sensor 33, in addition to the configuration of the vibration-driven energy harvesting section 10. The vibration-driven energy harvesting section 10a has a configuration similar to the configuration of the vibration-driven energy harvesting section 10 illustrated in FIG. 2 and thus the detailed illustration is omitted.

Figure 2:
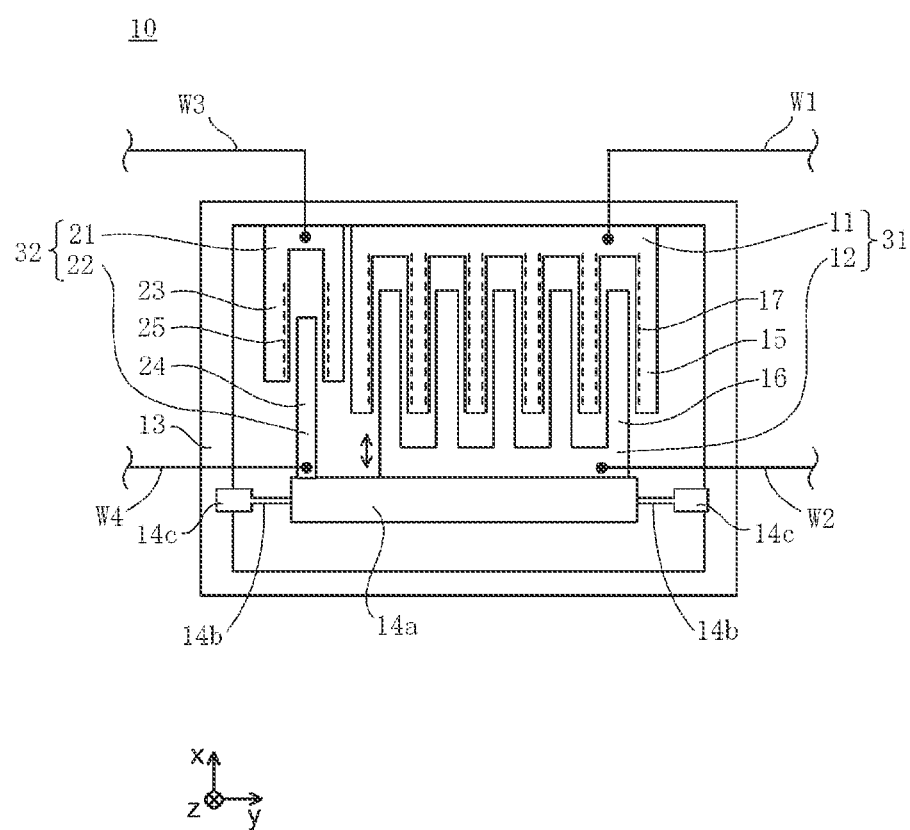
FIG. 2 is a diagram illustrating a schema of a vibration-driven energy harvesting section 10 included in the environmental energy harvesting device 1.

The vibration-driven energy harvesting section 10a includes the second environmental sensor 33, which is the same as the environmental sensor 32 (the third electrode 21 and the fourth electrode 22) of the vibration-driven energy harvesting section 10 illustrated in FIG. 2, adjacent to the environmental sensor 32 in the Y direction.

The configuration of the second environmental sensor 33 is the same as the configuration of the environmental sensor 32; a fifth electrode 25 is fixed to a support frame 13, and a sixth electrode 26 is retained by an electrode retaining portion 14a and made to be movable with respect to the fifth electrode 25 in the X direction in FIG. 2. The fifth electrode 25 is retained by the support frame 13 integrally with the first electrode 11, and the sixth electrode 26 is retained by the electrode retaining portion 14a integrally with the second electrode 12.

Faces of the fifth electrode 25 that face the sixth electrode 26 include surfaces which are formed with an electret that has positive or negative electric charge.

The fifth electrode 25 forming the second environmental sensor 33 is connected to one end of an output line W5, and the sixth electrode 26 forming the second environmental sensor 33 is connected to one end of an output line W6.

The other end of the output line W5 is connected to a first input part P13 of the current-voltage conversion circuit 70. The first input part P13 is also connected to the ground. The other end of the output line W6 is connected to a second input part P16 of the current-voltage conversion circuit 70.

A voltage detection circuit 711 included in the current-voltage conversion circuit 70 includes a rectifying element pair (Dc and Dd) including a rectifying element Dc and a rectifying element Dd such as diodes, and a detection circuit CP1 that detects a voltage on the second input part P16 side of this rectifying element pair (Dc and Dd). The rectifying element Dc and the rectifying element Dd are arranged in parallel such that orientations of anodes and cathodes of the rectifying element Dc and the rectifying element Dd are inverse to each other.

A voltage detection circuit 712 and a voltage detection circuit 713 each having the same configuration as the configuration of the voltage detection circuit 711 are connected in series to the voltage detection circuit 711. The voltage detection circuit 712 includes a rectifying element pair including a rectifying element De and a rectifying element Df, and a detection circuit CP2 that detects a voltage of an end part P15 on the rectifying element pair (Dc and Dd) side of this rectifying element pair (De and Df). The voltage detection circuit 713 includes a rectifying element pair including a rectifying element Dg and a rectifying element Dh, and a detection circuit CP3 that detects a voltage of an end part P14 on the rectifying element pair (De and Df) side of this rectifying element pair (Dg and Dh).

The detection circuits CP1 to CP3 are supplied with a reference voltage Vref respectively from a reference voltage generation circuit not illustrated.

The detection circuits CP1 to CP3 output detection signals V1 to V3 respectively based on their detected voltages.

The detection circuits CP1 to CP3 are each formed with, for example, a comparator including an operational amplifier.

The rectifying elements Dc and Dd included in the rectifying element pair of the voltage detection circuit 711, the rectifying elements De and Df included in the rectifying element pair of the voltage detection circuit 712, and the rectifying elements Dg and Dh included in the rectifying element pair of the voltage detection circuit 713 may have forward voltages different from one another or the same forward voltage.

The forward voltage refers to a voltage in a forward direction at which a large current starts to flow through a rectifying element when the voltage is applied to the rectifying element.

Note that the rectifying element Dc and the rectifying element Dd included in one rectifying element pair may have forward voltages different from one another or the same forward voltage, the rectifying element De and the rectifying element Df included in one rectifying element pair may have forward voltages different from one another or the same forward voltage, and the rectifying element Dg and the rectifying element Dh included in one rectifying element pair may have forward voltages different from one another or the same forward voltage.

Figure 7:
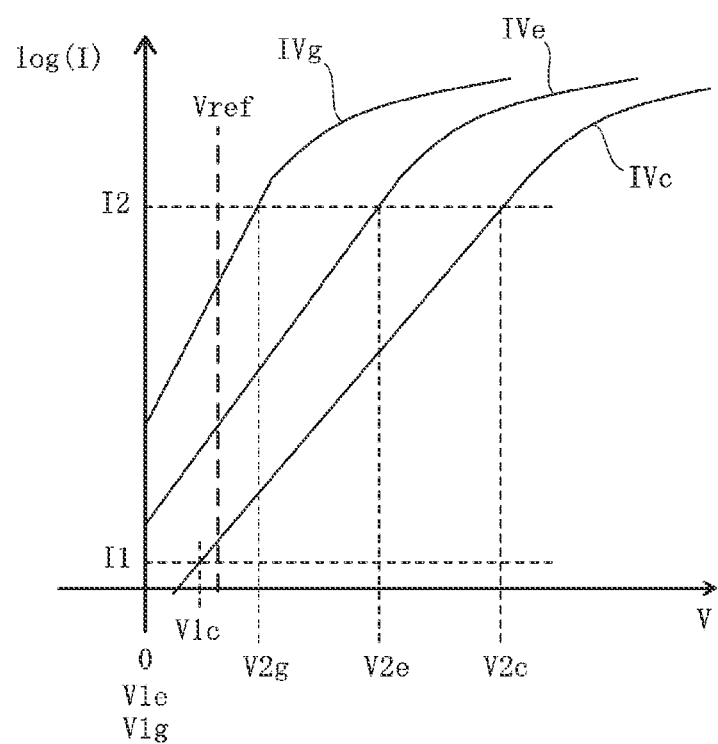
FIG. 7 is a graph illustrating a relation between a voltage and a current (IV characteristics) of each part in a current-voltage conversion circuit 70.

FIG. 7 is a graph illustrating a relation between a voltage and a current I (IV characteristics) of each part in the current-voltage conversion circuit 70 when a current flows from the second input part P16 towards the first input part P13. Note that the vertical axis of the graph represents a logarithm value (log) of the current I. An IV characteristic IVc indicates a relation between a voltage Vc of the second input part P16 and the current I, that is, an IV characteristic of the three rectifying elements Dc, De, and Dg connected in series. An IV characteristic IVe indicates a relation between a voltage Ve of the end part P15 and the current I, that is, an IV characteristic of the two rectifying elements De and Dg connected in series. An IV characteristic IVg indicates a relation between a voltage Vg of the end part P14 and the current I, that is, an IV characteristic of the rectifying element Dg.

Increase amounts of the three voltages Vc, Ve, and Vg when the current I gradually increases from zero are different from one another. Therefore, each of them becomes equal to the reference voltage Vref at different current values I, the comparators forming the detection circuits CP1 to CP3 are inverted, and the detection signals V1 to V3 change.

Note that, in this case, the rectifying elements Dd, Df, and Dh included in the current-voltage conversion circuit 70 become reverse biased and do not allow current to flow therethrough.

As illustrated in FIG. 7, in a case where the current flowing from the second input part P16 to the first input part P13 is I1, a voltage V1c occurs at the second input part P16, a voltage V1e occurs at the end part P15, and a voltage V1g occurs at the end part P14. Note that the voltage V1e and the voltage V1g are 0 V because the current I is small.

In a case where the current flowing from the second input part P16 to the first input part P13 is I2, a voltage V2c occurs at the second input part P16, a voltage V2e occurs at the end part P15, and a voltage V2g occurs at the end part P14.

The voltages Vc, Ve, and Vg change in accordance with an amount of the current flowing from the second input part P16 toward the first input part P13.

Therefore, the amount of the current flowing from the second input part P16 toward the first input part P13 can be estimated using the detection signals V1 to V3 based on the voltages detected by the detection circuits CP1 to CP3.

The detection signals V1 to V3 from the detection circuits CP1 to CP3 are input into a control circuit 72. The control circuit 72 includes, for example, an AD conversion circuit that converts the detection signals V1 to V3 into digital signals. Based on the detection signals V1 to V3 converted into the digital signals, the control circuit 72 estimates the amount of the current flowing from the second input part P16 to the first input part P13, that is, an amount of current output from the second environmental sensor 33.

Based on the estimated amount of the current, the control circuit 72 sends a control signal CS to a voltage converting circuit 60 to change an operation condition for the voltage converting circuit 60. The operation condition for the voltage converting circuit 60 refers to, for example, a condition of amplification of a voltage to be output to an output part Vout with respect to a voltage that is input between the first input part Vin1 and the second input part Vin2.

For example, in a case where the voltage converting circuit 60 is a circuit including a chopper, the operation condition can be changed by changing a period with which the chopper operates.

Note that the control circuit 72 may change the operation condition for the voltage converting circuit 60 based on the detection signals V1 to V3 without estimating the amount of the current from the second environmental sensor 33 as described above.

Since the second environmental sensor 33 and an energy converting element 31 are vibration-driven energy harvesting elements that are mechanically integrated with each other, the amount of the current from the second environmental sensor 33 is generally proportional to an amount of electricity generated by the energy converting element 31.

Therefore, in the environmental energy harvesting device 1b in the third embodiment, the operation condition for the voltage converting circuit 60 can be set at an optimum condition in accordance with the amount of electricity generated by the energy converting element 31, so that an efficiency of the environmental energy harvesting device 1b including the voltage converting circuit 60 can be increased.

The environmental energy harvesting device 1b in the third embodiment described above includes the energy converting element 31 that converts environmental energy into electric energy and the second environmental sensor 33 that is disposed in the same environment as the energy converting element 31. The environmental energy harvesting device 1b further includes the power supply circuit 80b that receives the electricity converted into by the energy converting element 31 and outputs the electricity to the outside, and the power supply circuit 80b changes the operation condition in accordance with an output of the second environmental sensor 33.

In addition, the power supply circuit 80b changes the operation condition in accordance with a real-time output that is output by the second environmental sensor 33. With this configuration, even in a case where vibration of an environment where the vibration-driven energy harvesting section 10a is installed changes every moment, the operation condition for the power supply circuit 80b can be controlled under an optimum condition that responds to a situation of the vibration in real time, so that the efficiency of the environmental energy harvesting device 1b can be further increased.

The current-voltage conversion circuit 70 of the environmental energy harvesting device 1b in the third embodiment causes current to flow through the circuit in which a plurality of rectifying element pairs (Dc and Dd, De and Df, and Dg and Dh) in each of which the rectifying elements are arranged in parallel, are connected in series such that the orientations of the anodes and cathodes of the rectifying elements are inverse to each other, and detects a voltage that occurs across both ends of each rectifying element pair. In this configuration, it is possible to respond to changes in current in a wider range without causing a high voltage when compared with a conventional configuration that caused current to flow through a resistor and detects a voltage occurring across both ends of the resistor.

That no high voltage occurs on a circuit side means that it is possible to restrain an action to suppress the vibration of the second environmental sensor 33 to an extremely low level.

In the environmental energy harvesting device 1b in the third embodiment, the second environmental sensor 33 need not necessarily output a current having the same phase as energy converting element 31. Therefore, in the vibration-driven energy harvesting section 10, the fifth electrode 25 of the second environmental sensor 33 and the first electrode 11 of the energy converting element 31 are not necessarily retained integrally, and the sixth electrode 26 of the second environmental sensor 33 and the second electrode 12 of the energy converting element 31 are not necessarily retained integrally.

In the above example, in the vibration-driven energy harvesting section 10, the second environmental sensor 33 is provided separately from the environmental sensor 32, but the second environmental sensor 33 may be omitted, and the environmental sensor 32 also may be used as the second environmental sensor 33.

In addition, in the environmental energy harvesting device 1b in the third embodiment, the voltage limiting circuit 40 may be omitted, and the rectifier circuit 50 may be formed with a rectifier circuit that includes normal diodes. In the environmental energy harvesting device 1b in the third embodiment, since the operation condition of the voltage converting circuit 60 is set at an optimum condition in accordance with the amount of electricity generated by the energy converting element 31, it is possible to convert environmental energy into electric energy efficiently. Therefore, even in a case where a rectifier circuit that includes diodes is used as the rectifier circuit 50, it is possible to implement an environmental energy harvesting device that is efficient when compared with a conventional one.

(Modifications)

Modifications of the environmental energy harvesting devices 1, 1a, and 1b in the embodiments described above will be described below.

In the above description, the energy converting element 31 and the environmental sensor 32 as well as the second environmental sensor 33 of the vibration-driven energy harvesting section 10 are each formed with a vibration-driven energy harvesting element. However, the environmental sensor 32 and the second environmental sensor 33 each may be an element that converts vibration of an accelerometer and so on into an electric signal, other than a vibration-driven energy harvesting element.

In addition, the energy converting element 31 is not limited to the vibration-driven energy harvesting element described above, either; for example, the energy converting element 31 may be a photoelectric converting element that converts light energy present in an environment into electric energy, such as a solar battery. In this case, the environmental sensor 32 as well as the second environmental sensor 33 are each formed with a photoelectric converting element and disposed in the same environment as the energy converting element 31.

In addition, the energy converting element 31 may be a thermoelectric generating element that converts thermal energy present in an environment into electric energy. In this case, the environmental sensor 32 as well as the second environmental sensor 33 are each formed with a thermoelectric generating element and disposed in the same environment as the energy converting element 31.

Also in this case, the environmental sensor 32 and/or the second environmental sensor 33 are each formed with a low-output sensor that less consumes environmental energy. In addition, the operation condition for the power supply circuit 80, 80a, or 80b that outputs electricity converted into by the energy converting element 31 to the outside is changed in accordance with the output of the environmental sensor 32 or the second environmental sensor 33. With this configuration, it is possible to implement an environmental energy harvesting device that converts environmental energy into electric energy and outputs the electric energy to the outside efficiently.

(Advantageous Effects of Embodiments and Modifications)

(1) The environmental energy harvesting devices 1, 1a, and 1b in the embodiments and the modifications described above each include the energy converting element 31 that converts environmental energy into electric energy, and the environmental sensor 32 that is disposed in the same environment as the energy converting element 31, and the power supply circuit 80 or 80a that receives electricity converted into by the energy converting element 31 and outputs the electricity to the outside, and the power supply circuit 80 or 80a changes the operation condition in accordance with the output of the environmental sensor 32.

With this configuration, it is possible to convert low-power energy in an environment into electric energy with low loss.

(2) In addition, with a configuration in which the power supply circuits 80 and 80a each change the operation condition in accordance with the real-time output from the environmental sensor 32, it is possible to convert low-power energy in an environment into electric energy with lower loss.

(3) In addition, with a configuration in which the energy converting element 31 is an element that generates alternating-current electricity, the power supply circuits 80 and 80a each include the rectifier circuit 50 that rectifies the alternating-current electricity converted into by the energy converting element 31, and the rectifier circuit 50 has the switching elements M1 to M4 that change the rectification condition in accordance with the output of the environmental sensor 32, it is possible to convert low-power energy in an environment into electric energy with further lower loss.

(4) In addition, with a configuration in which the environmental sensor 32 outputs an alternating-current signal with a frequency equal to a frequency of the alternating-current electricity converted into by the energy converting element 31, it is possible to increase an efficiency of the rectification by the rectifier circuit 50.

(5) In addition, with a configuration in which the power supply circuits 80 and 80a each have the voltage limiting circuit 40 that limits the alternating-current signal output by the environmental sensor 32 to a voltage within a predetermined range, it is possible to reduce an amount of energy that is consumed as electric energy generated by the environmental sensor 32 from low-power energy present in an environment. It is thereby possible to convert low-power energy present in an environment into electric energy with the energy converting element 31 with low loss.

(6) In addition, with a configuration in which the voltage limiting circuit 40 includes the bridge circuit (T11 to T8) that is formed with MOSFETs, it is possible to further reduce the amount of energy that is generated and consumed by the environmental sensor 32 from low-power energy present in an environment.

(7) In addition, with a configuration in which the voltage limiting circuit 40a includes the dynamic comparator 41 that receives the alternating-current signal output by the environmental sensor 32 and the memory circuit 42 that stores the output of the dynamic comparator 41, it is possible to even further reduce the amount of energy that is generated and consumed by the environmental sensor 32 from low-power energy present in an environment.

(8) In addition, with a configuration in which the power supply circuit 80b includes the current-voltage conversion circuit 70 that outputs a voltage signal in accordance with an amount of current output by the environmental sensor 32 (and the second environmental sensor 33), and the power supply circuit 80a changes the operation condition based on the output signal from the current-voltage conversion circuit 70, it is possible to convert low-power energy in an environment into electric energy with low loss.

(9) In addition, the current-voltage conversion circuit 70 may have a configuration that includes a circuit in which the plurality of voltage detection circuits 711 to 713 are connected in series, the voltage detection circuits 711 to 713 including the rectifying element pairs (Dc and Dd, De and Df, and Dg and Dh) in each of which the rectifying elements are arranged in parallel such that the orientations of the anodes and cathodes of the rectifying elements are inverse to each other and including the detection circuits CP1 to CP3 each of which detects a voltage that occurs at one end of the corresponding rectifying element pair, and the power supply circuit 80b may have a configuration in which the power supply circuit 80b changes the operation condition based on detection signals from the plurality of voltage detection circuits 711 to 713. With this configuration, even in a case where the amount of current generated by the energy converting element 31 fluctuates, it is possible to output the generated electricity with the power supply circuit 80b to the outside efficiently.

Various embodiments and modifications have been described above, but the present invention is not limited to these details. The embodiments and the modifications may be each applied alone or may be used in combination. Other embodiments contemplated within the scope of the technical concept of the present invention are also included within the scope of the present invention.

The disclosure of the following priority application is incorporated herein by reference.

Japanese Patent Application No. 2019-116310 (filed on Jun. 24, 2019)

REFERENCE SIGNS LIST 1, 1a, 1b . . . environmental energy harvesting device, 10, 10a . . . vibration-driven energy harvesting section, 80, 80a, 80b . . . power supply circuit, 31 . . . energy converting element, 32 . . . environmental sensor, 40, 40a . . . voltage limiting circuit, 50 . . . rectifier circuit, 60 . . . voltage converting circuit, 70 . . . current-voltage conversion circuit, M1 to M4 . . . switching element, T1 to T8 . . . control element (MOSFET), 41 . . . dynamic comparator, 42 . . . memory circuit, Ta to Tl . . . MOSFET, CP1 to CP3 . . . voltage detection circuit, Da to DhDg . . . rectifying element (diode), C1 . . . first capacitor, C2 . . . second capacitor, R0 . . . external load

The invention claimed is:

1. An environmental energy harvesting device comprising:
an energy converting element that converts environmental energy into electric energy;
an environmental sensor that is disposed in an identical environment as the energy converting element; and
a power supply circuit that receives electricity generated by the energy converting element and outputs the electricity to an external load, the power supply circuit includes a voltage limiting circuit that limits an alternating-current signal output by the environmental sensor to a voltage within a predetermined range, the voltage limiting circuit includes a dynamic comparator that receives the alternating-current signal output by the environment sensor and a memory circuit that stores an output of the dynamic comparator,
wherein the power supply circuit changes an operation condition in accordance with an output of the environmental sensor.

2. The environmental energy harvesting device according to claim 1, wherein the power supply circuit changes the operation condition in accordance with a real-time output from the environmental sensor.

3. The environmental energy harvesting device according to claim 1, wherein
the energy converting element is an element that generates alternating-current electricity,
the power supply circuit includes a rectifier circuit that rectifies alternating-current electricity converted into by the energy converting element, and
the rectifier circuit includes a switching element that changes a connection condition for the circuit in accordance with the output of the environmental sensor.

4. The environmental energy harvesting device according to claim 3, wherein the environmental sensor outputs the alternating-current signal with a frequency equal to a frequency of the alternating-current electricity converted into by the energy converting element.

5. The environmental energy harvesting device according to claim 4, wherein the voltage limiting circuit includes two rectifying elements that are arranged in parallel on an input side of the dynamic comparator such that orientations of anodes and cathodes of the rectifying elements are inverse to each other.

6. The environmental energy harvesting device according to claim 1, wherein the voltage limiting circuit includes a diode bridge circuit that is formed with MOSFETs.

7. The environmental energy harvesting device according to claim 1, wherein
the power supply circuit includes a current-voltage conversion circuit that outputs a voltage signal in accordance with an amount of current output by the environmental sensor, and
the power supply circuit changes the operation condition based on an output voltage from the current-voltage conversion circuit.

8. The environmental energy harvesting device according to claim 7, wherein the current-voltage conversion circuit includes a circuit in which a plurality of voltage detection circuits are connected in series, the voltage detection circuits including rectifying element pairs in each of which rectifying elements are arranged in parallel such that orientations of anodes and cathodes of the rectifying elements are inverse to each other and including detection circuits that detect voltages that occur at one ends of the rectifying element pairs, and the power supply circuit changes the operation condition based on detection signals from the plurality of voltage detection circuits.

9. The environmental energy harvesting device according to claim 1, wherein the energy converting element and the environmental sensor are vibration-driven energy harvesting elements.

10. An environmental energy harvesting device comprising:

an energy converting element that converts environmental energy into electric energy;

an environmental sensor that is disposed in an identical environment as the energy converting element; and a power supply circuit that receives alternating-current electricity generated by the energy converting element and outputs the direct-current electricity to an external load, wherein the power supply circuit changes an operation condition in accordance with an output of the environmental sensor, the power supply circuit includes a current-voltage conversion circuit that outputs a voltage signal in accordance with an amount of current output by the environmental sensor, the power supply circuit changes the operation condition based on an output voltage from the current-voltage conversion circuit, the current-voltage conversion circuit includes a circuit in which a plurality of voltage detection circuits are connected in series, the voltage detection circuits including rectifying element pairs in each of which rectifying elements are arranged in parallel such that orientations of anodes and cathodes of the rectifying elements are inverse to each other and including detection circuits that detect voltages that occur at one ends of the rectifying element pairs, and the power supply circuit changes the operation condition based on detection signals from the plurality of voltage detection circuits.

* * * * *